United States Patent [19]

Drewery

[11] 4,212,028

[45] Jul. 8, 1980

[54] PROCESSING PAL COLOR TELEVISION SIGNALS

[75] Inventor: John O. Drewery, Coulsdon, England

[73] Assignees: The Marconi Company Limited, Chelmsford; Standard Telephones and Cables Limited, London, both of England

[21] Appl. No.: 938,028

[22] Filed: Aug. 30, 1978

[30] Foreign Application Priority Data

Sep. 1, 1977 [GB] United Kingdom ............... 36590/77

[51] Int. Cl.² ............................................. H04N 9/39
[52] U.S. Cl. ........................................ 358/11; 358/13; 358/16
[58] Field of Search .......................... 358/11, 12, 13, 16

[56] References Cited

U.S. PATENT DOCUMENTS

| 3,891,994 | 6/1975 | Phillips et al. ........................ 358/11 |
| 4,051,516 | 9/1977 | Weston .................................. 358/11 |

FOREIGN PATENT DOCUMENTS 2521288 11/1975 Fed. Rep. of Germany .
1511230 5/1978 United Kingdom .

Primary Examiner—Robert L. Richardson
Attorney, Agent, or Firm—Kemon & Estabrook

[57] ABSTRACT

In a method and apparatus for transcoding digital PAL color television signals between (i) a 2fsc format consisting of an encoded signal of PAL type sampled at 2fsc and (ii) a 3fsc format consisting of a luminance signal Y at 2fsc and a chrominance signal C sampled at fsc and comprising U+V and U−V on alternate lines (or either the luminance signal or composite chrominance signal by itself), avoid the need to convert the signal to analogue PAL form as an intermediate step. Converting from the 2fsc to the 3fsc format, over the chrominance bandwidth undelayed and 1- and 2-line delayed samples are combined in the proportions $\frac{1}{4}:\frac{1}{2}:\frac{1}{4}$, and below the chrominance band the 1-line delayed samples are low-pass filtered, these together providing the luminance signal Y. To provide the chrominance signal C the undelayed and 2-line delayed signals are combined in the proportions $-\frac{1}{4}:\frac{1}{4}$. The low- and band-pass filters are digital transversal filters operating on adjacent samples in the signal. Transcoding in the other direction is similar.

8 Claims, 16 Drawing Figures

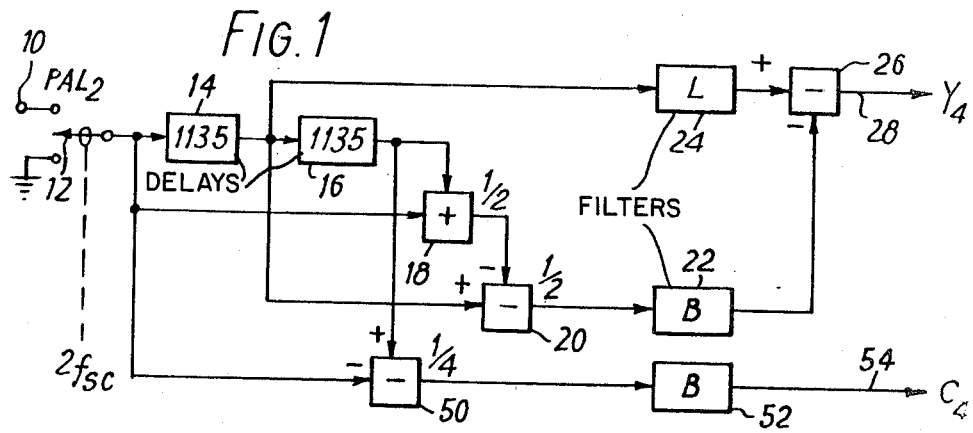
FIG. 1
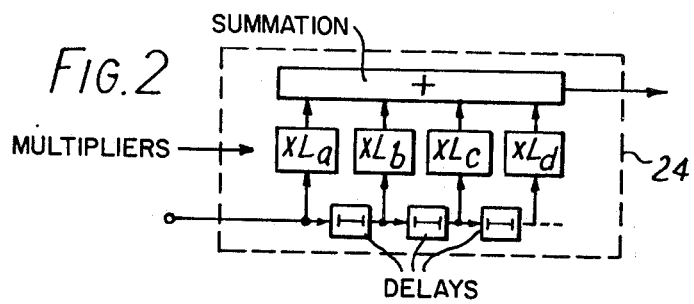
FIG. 2
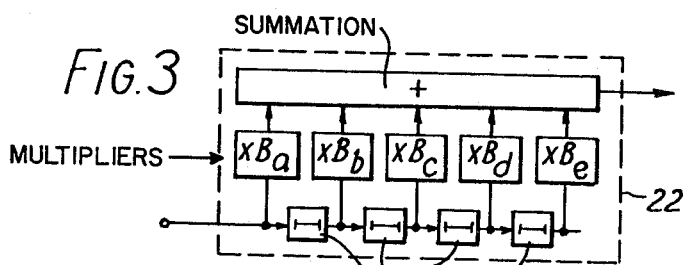
FIG. 3
FIG. 4
$$----\ \tfrac{1}{4}B_2 \quad \tfrac{1}{4}B_1 \quad \tfrac{1}{4}B_0 \quad \tfrac{1}{4}B_1 \quad \tfrac{1}{4}B_2 ----$$
$$----L_2-\tfrac{1}{2}B_2 \quad L_1-\tfrac{1}{2}B_1 \quad L_0-\tfrac{1}{2}B_0 \quad L_1-\tfrac{1}{2}B_1 \quad L_2-\tfrac{1}{2}B_2----$$
$$----\ \tfrac{1}{4}B_2 \quad \tfrac{1}{4}B_1 \quad \tfrac{1}{4}B_0 \quad \tfrac{1}{4}B_1 \quad \tfrac{1}{4}B_2 ----$$

$$\begin{array}{cccccc}
=---- & \tfrac{1}{4}B_2 & O & \tfrac{1}{4}B_0 & O & \tfrac{1}{4}B_2 \;----- \\
----- & O & L_1 & \tfrac{1}{2} & L_1 & O \;----- \\
--- & \tfrac{1}{4}B_2 & O & \tfrac{1}{4}B_0 & O & \tfrac{1}{4}B_2 \;----
\end{array}$$

$$\begin{array}{cccccc}
---- & X & O & X & O & X \;----- \\
---- & O & X & O & X & O \;----- \\
---- & X & O & X & O & X \;-----
\end{array}$$

FIG. 8
$$\cdots\ \tfrac{1}{4}B_2\quad O\quad \tfrac{1}{4}B_0\quad O\quad \tfrac{1}{4}B_2\ \cdots$$
$$\cdots\ O\quad O\quad O\quad O\quad O\ \cdots$$
$$\cdots\ -\tfrac{1}{4}B_2\quad O\quad -\tfrac{1}{4}B_0\quad O\quad -\tfrac{1}{4}B_2\ \cdots$$
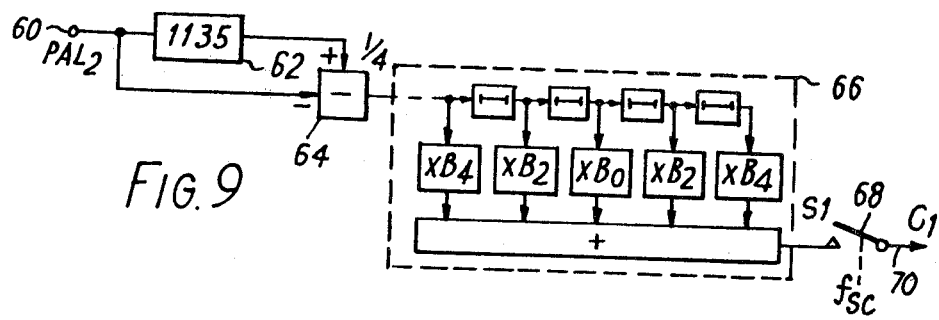
FIG. 9
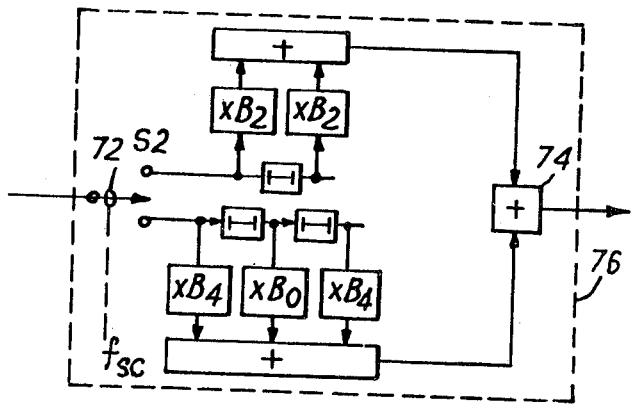
FIG. 10

FIG.14
```
X   O   O   O   X   O   O   O   X
O   X   O   O   O   X   O   O   O
O   O   X   O   O   O   X   O   O
```
FIG.15
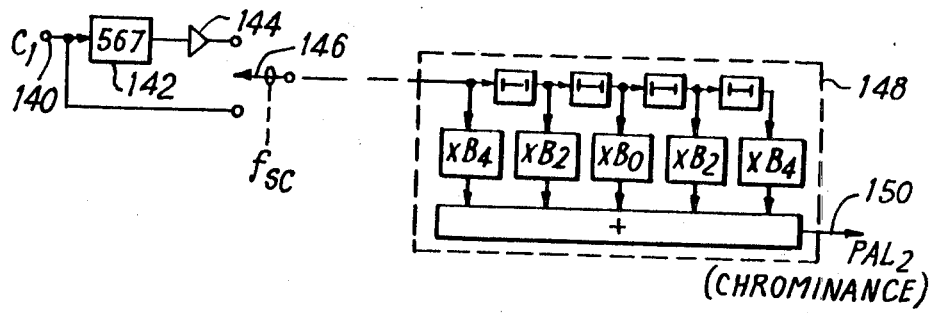
FIG.16
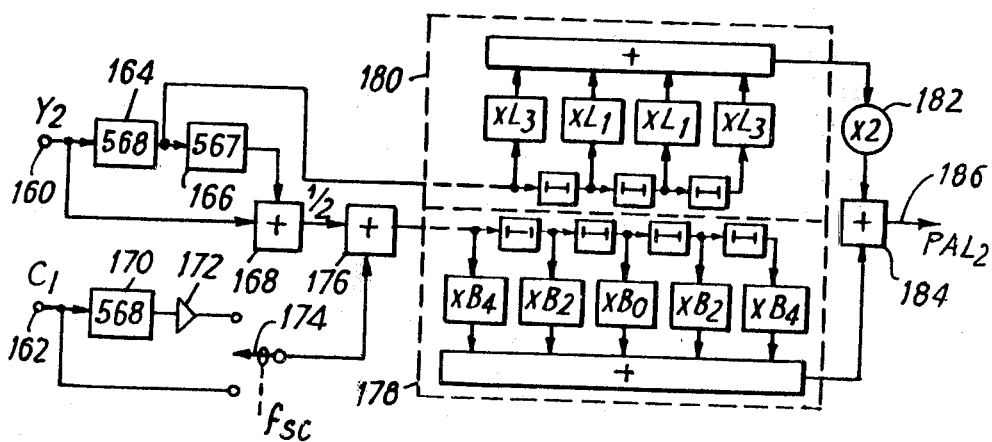

PROCESSING PAL COLOR TELEVISION SIGNALS

This invention is concerned with the processing of PAL colour television signals in digital form.

British Pat. No. 1,511,230 describes a system for sampling an encoded PAL signal at a sample rate of twice the colour subcarrier frequency 2 $f_{sc}$. This sample rate is below the Nyquist limit, but problems caused by this are minimised by sampling the encoded PAL signal at specified sampling phases which are spaced one eighth (45°) of the subcarrier period from the zero crossings of the U component of the PAL signal, and by using appropriate comb filtering. This then is one way of digitising a PAL signal, and the signal obtained is hereinafter referred to as being in "2$f_{sc}$ format".

British Patent Applications Nos. 56049/74 and 11220/78 (corresponding U.S. Pat. No. 4,051,516) on the other hand describe another system for digitising PAL signals, in which the luminance component Y is digitised at a sampling rate of 2 $f_{sc}$, while the chrominance components U and V are formed into a composite chrominance signal C consisting of U+V and U−V on alternate lines, this composite chrominance signal being sampled at a sample rate equal to the subcarrier frequency $f_{sc}$. In each case comb filtering is again desirably included. The total bandwidth of the PAL signal in this system is thus seen to be 3 $f_{sc}$, and the signal is therefore hereinafter referred to as being in "3 $f_{sc}$ format".

Both systems have their advantages and it is possible that both will gain acceptance for different purposes. In that case there will then be a need to transcode between the two formats. This could be done by effecting the conversion in two stages, in the first stage the input signal would be converted into analogue encoded PAL form, and in the second stage the analogue PAL signal would be converted into the other format desired for the output signal. However, the conversion to analogue form is clumsy and bound to introduce degradation into the signal. Circumstances may also arise where it is desired to derive from a signal in 2 $f_{sc}$ format just the luminance signal Y above or the composite chrominance signal C above, or to encode either one of these signals into an encoded PAL-type signal.

In accordance with this invention there is provided a method of and apparatus for processing colour television signals of PAL type in digital form, in which the signals are transcoded between (i) an encoded signal of PAL type sampled at 2 $f_{sc}$ (e.g. the 2 $f_{sc}$ format) and (ii) a luminance signal Y sampled at 2 $f_{sc}$ and/or a composite chrominance signal C sampled at $f_{sc}$ and comprising U+V and U−V on alternate lines (e.g. the components of the 3 $f_{sc}$ format). The output signals are formed over the chrominance bandwidth by linearly combining samples from three or more adjacent lines of the television signal, and below the chrominance signal from the samples on at least one of the adjacent lines. The samples are digitally filtered, to provide the desired output signal.

Preferably the filtering is achieved by linearly combining adjacent samples in the same line using a static digital transversal filter, so that each output sample is thus obtained by a linear combination of several adjacent samples from each of at least three adjacent lines of the signal.

The invention will now be described in more detail, by way of example, with reference to the drawings, in which:

FIG. 1 is a block diagram of a transcoder embodying the invention for transcoding from 2 $f_{sc}$ format to 3 $f_{sc}$ format;

FIG. 2 is a block diagram of a digital transversal low-pass filter used in the transcoder of FIG. 1;

FIG. 3 is a block diagram of a digital transversal bandpass filter used in the transcoder of FIG. 1;

FIG. 4 is a spatial diagram illustrating, as on a portion of a field display, the relative weights of the samples used from three successive lines to form one luminance output sample with the system of FIG. 1;

FIG. 8 is a spatial diagram similar to FIG. 4 showing the relative weights needed to form one composite chrominance output sample;

FIG. 9 is a block diagram of a circuit embodying the invention based on the transcoder of FIG. 1 for generating a composite chrominance signal, sampled at $f_{sc}$, from a 2 $f_{sc}$ encoded PAL signal;

FIG. 10 illustrates an alternative configuration for the filter of FIG. 9;

FIG. 14 is a spatial diagram showing which of the 4 $f_{sc}$ samples of the composite chrominance signal are zero and which are non-zero;

FIG. 15 is a block diagram of a modification of the circuit of FIG. 13; and

FIG. 16 is a block diagram of a transcoder embodying the invention for transcoding from 3 $f_{sc}$ format to 2 $f_{sc}$ format, and based on the circuits of FIGS. 12 and 15.

Figures 5, 6, 7:
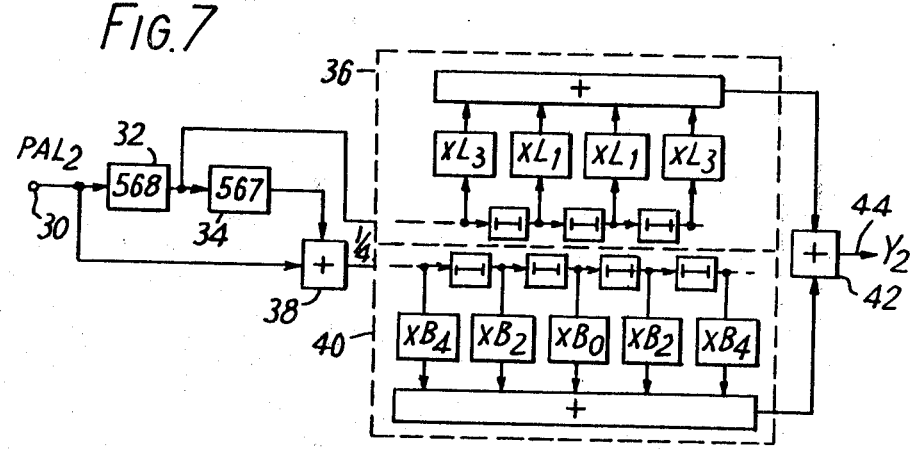
FIG. 5 is a spatial diagram based on FIG. 4 after simplification.
FIG. 6 is a spatial diagram showing which of the 4 $f_{sc}$ samples are zero and which are non-zero.
FIG. 7 is a block diagram of a circuit embodying the invention based on the transcoder of FIG. 1 for generating a 2 $f_{sc}$ sampled luminance signal from a 2 $f_{sc}$ encoded PAL signal.

FIG. 1 shows a transcoder for transcoding from 2 $f_{sc}$ PAL (denoted PAL$_2$) to luminance Y and composite chrominance C in accordance with the 3 $f_{sc}$ format. The transcoder has an input 10 for receiving the input PAL$_2$ signal connected to one input of a selector switch 12, the other input of which is grounded. The switch 12 is operated at a fixed frequency of 2 $f_{sc}$ such that between each pair of samples of the incoming PAL$_2$ signal there is inserted an additional sample of value zero. The sample rate at the switch output is thus 4 $f_{sc}$.

To the switch output are connected in series two one-line delays 14 and 16, each formed of a 1135-sample serial store clocked at 4 $f_{sc}$. A half-adder 18 and halving subtractor 20 combine the outputs of switch 12, delay 14 and delay 16 as follows. Half-adder 18 adds the outputs of switch 12 and delay 16 and applies the resultant, halved, to the inversion input of subtractor 20, the non-inversion input of which receives the output of delay 14. The output of subtractor 20 when halved thus consists of samples from three successive lines $S_{-l}$, $S_o$, $S_l$ in the proportions:

$$-\tfrac{1}{4}S_{-l} + \tfrac{1}{2}S_o - \tfrac{1}{4}S_l.$$

A band-pass filter 22, labelled B, is connected to the output of the subtractor 20, and a low-pass filter 24, labelled L, is connected to the output of the one-line delay 14. A subtractor 26 has its inversion input connected to the output of the band-pass filter 22 and its non-inversion input connected to the output of the low pass filter 24, and the output 28 of the subtractor 26 constitutes the luminance signal output.

It will be appreciated that other rearrangements of the filters 22 and 24 are possible, for example the low pass filter 24 could be placed at the output of subtractor 26, in which case the filter 22 could take the form of a high pass filter. In any event, however, the filters are effective to filter the signal applied to the inversion input of subtractor 26 so as to pass to the output only signal components in the range of frequencies occupied by the chrominance component of the signal, and as discussed in British Pat. No. 1,511,230 the relevant frequency band is in fact the band $(2 f_{sc} - f_v)$ to $f_v$, where $f_v$ is the maximum nominal frequency of the video spectrum. The signal applied to the non-inversion input of subtractor 26 is low-pass filtered with a cut-off frequency of $f_v$.

It will be seen from the above that the output signal at output 28 consists for signals of below the frequency $2 f_{sc} - f_v$ simply of $S_o$, while over the frequency band $(2 f_{sc} - f_v)$ to $f_v$ containing the chrominance band the output consists of $S_o - (-\tfrac{1}{4}S_{-l} + \tfrac{1}{2}S_o - \tfrac{1}{4}S_l)$, i.e. $\tfrac{1}{4}S_{-l} + \tfrac{1}{2}S_o + \tfrac{1}{4}S_l$.

The filters 22 and 24 are digital transversal filters, that is to say they each consist of a series of single-sample delays with means for forming a weighted combination of the outputs of these delays, this means in principle being formed of a respective coefficient multiplier connected to the output of each sample delay and to the input, and means for summing the multiplier outputs. Filter 24 is shown in FIG. 2 and uses multiplier coefficients $L_a \ldots L_i$ respectively and filter 22 is shown in FIG. 3 and uses multiplier coefficients $B_a \ldots B_j$ respectively. The number of delays required in each filter is determined by the accuracy required. Digital transversal filters are in themselves well known, and further detailed description is therefore unnecessary, their construction being readily apparent from the figures.

The manner in which the luminance signal Y is derived in the transcoder of FIG. 1 from the samples from three successive lines of the signal will next be described with reference to FIGS. 4 to 6. As transversal filters are used for filters 22 and 24, then a finite number of input samples on each of the three lines contribute to each output sample which lies, spatially (i.e. in the picture), in the centre of the contribution area thus formed. FIG. 4 shows in spatial form the pattern of the weighting coefficients which are applied to the 4 $f_{sc}$ input samples, where $L_0$, $L_1$ etc. are the coefficients of L about the central coefficient $L_0$, and likewise $B_0$, $B_1$ etc. are the coefficients of B about the central coefficient $B_0$. It is seen from FIG. 4 that the coefficients of L are only applied to the middle line (compare FIG. 1) while the coefficients of B are applied to corresponding samples from the three lines in the proportions $\tfrac{1}{4}:\tfrac{1}{2}:\tfrac{1}{4}$.

Now, because the spectral characteristic of B is symmetrical about subcarrier frequency, all the odd coefficients of B, namely $B_1$, $B_3$ etc, are zero. Moreover, it can be shown that the relationship between the spectral characteristics of the filters B and L is such that the even coefficients, other than the zero coefficient, of B are twice the corresponding coefficients of L, so that the terms $L_2 - \tfrac{1}{2}B_2$ etc, are all zero. The value of $L_o - \tfrac{1}{2}B_o$ can similarly be shown to be $\tfrac{1}{2}$. Taking these factors into account, therefore, the spatial algorithm of FIG. 4 reduces to that of FIG. 5.

It will be recalled that the 4 $f_{sc}$ samples were formed by interposing zero-value samples between every incoming pair of 2 $f_{sc}$ samples. The spatial pattern of the 4 $f_{sc}$ input samples is thus as shown in FIG. 6, where zero-value samples are indicated by 0 and non-zero samples by X. When an output sample corresponds to the position of a non-zero input sample, i.e. one of the 2 $f_{sc}$ samples, the algorithm of FIG. 5 has only one term which multiplies a nonzero input sample, and that is the central term of value $\tfrac{1}{2}$. Thus the output consists of the unmodified 2 $f_{sc}$ sample, except only for the factor of 2, since for all samples other than at the origin either the sample or the coefficient is zero.

The output samples are being generated at 4 $f_{sc}$ whereas it is required that the luminance output Y should be at 2 $f_{sc}$. From the above it is seen that the output samples corresponding to the non-zero input samples consist of the input samples themselves, i.e. the encoded PAL signal sampled at 2 $f_{sc}$. These alternate output samples are therefore not required to constitute the 2 $f_{sc}$ luminance output.

The wanted luminance samples consist of the other alternate samples, corresponding spatially to the positions of the zero-value 4 $f_{sc}$ input samples. If the algorithm of FIG. 5 is now applied to the samples of FIG. 6 in this situation only, the origin value of $\tfrac{1}{2}$ is ignored because it multiplies a zero-value input sample, and the algorithm pattern is then effectively a 2 $f_{sc}$ pattern. It can be shown that this algorithm is the same as would be obtained had the input samples been converted to analogue form and then resampled, but the errors introduced by the digital-to-analogue and analogue-to-digital converters are avoided.

As every other output sample is ignored it is possible to operate at a sample frequency of 2 $f_{sc}$ and avoid introducing spurious zero-value samples. The luminance part of the circuit of FIG. 1 now reduces to the circuit of FIG. 7.

In the circuit of FIG. 7, an input 30 for receiving incoming PAL samples at a sampling rate of 2 $f_{sc}$ is connected to two sample stores 32 and 34 connected in series, the first sample store 32 providing a delay of 568 samples and the second sample store 34 providing a delay of 567 samples. Each delay thus provides a substantially one-line delay at 2 $f_{sc}$. The one-line delayed signal from store 32 is applied to a digital transversal filter 36 corresponding to the filter 24 of FIG. 1 and having coefficients $L_1$, $L_3$ etc. An adder 38 adds the undelayed and two-line delayed signals from the input 30 and the output of store 34 respectively, and divides the resultant sum by four. The output of adder 38 is applied to a digital transversal filter 40 corresponding to the filter 22 of FIG. 1 and having coefficients $B_0$, $B_2$, $B_4$ etc. The outputs of the filters 36 and 40 are summed in an adder 42 which provides the 2 $f_{sc}$ luminance signal $Y_2$ at an output 44.

The number of individual sample stores and corresponding multiplier coefficients in each of the filters 36 (or L) and 40 (or B) depends on the required fidelity of the $Y_2$ signal. For the simplest case there is one store in filter 36, which uses coefficients only of value $L_1$, and two stores in filter 40, which uses coefficients of value $B_0$ and $B_2$, where $B_0 = 7/8$, $L_1 = \frac{1}{2}$ and $B_2 = -\frac{1}{8}$. Such a system has the theoretically correct performance at only the zero and subcarrier frequencies. Higher-order filters can be made to have correct performance at more frequencies.

Which of the delays 32 and 34 has the larger capacity (568 samples as opposed to 567) depends on whether filter B or filter L has the higher number of terms (or sample stores). Preferably B has the higher number of terms. Then the performance at subcarrier frequency can be specified in a discrete Fourier transform.

Reference will now be made again to FIG. 1 for a description of how the composite chrominance output signal C is derived. For this purpose a combining circuit 50 is connected with its inverting input coupled to the output of the switch 12 and its non-inverting input connected to the output of the delay 16. The difference signal is then divided by four, and applied to a digital transversal bandpass filter 52 which is of the same type as the filter 22 of FIGS. 1 and 3. The chrominance samples at $4 f_{sc}$ appear at an output 54.

From FIG. 1 it is seen that the output samples at output 54 are derived from only the two outermost of each set of three lines, and it will be remembered that odd coefficients of B are zero due to the symmetry of the pass-band. Thus the spatial algorithm is as shown in FIG. 8. Applying this algorithm to the input sample pattern of FIG. 6 again yields zero values for those output samples which coincide spatially with the non-zero input samples. The other alternate output samples are not zero but form a sample chain at $2 f_{sc}$.

It is noted in the aforementioned British Patent Application No. 56049/74 that the wanted composite chrominance samples occur at the same instants as the luminance samples, but at half the sample rate. It does not matter which of the two sets of alternate samples occurring at $f_{sc}$ is chosen.

The composite chrominance path can be realised as in FIG. 9 at a sample rate of $2 f_{sc}$, with alternate output samples being discarded. Referring to FIG. 9, an input 60 is connected to a two-line delay 62 formed of a 1135-sample serial store clocked at $2 f_{sc}$. The input and output of the delay 62 are substracted in a subtractor 64, and the resultant divided by four and applied to a digital transversal band pass filter 66, of the B type. The output of filter 66 consisting of samples at $2 f_{sc}$ is applied to a switch 68 which selects alternate samples, at a rate $f_{sc}$, for application to an output 70, where they form the composite chrominance output signal.

The sample rate in the filter 66 in the chrominance path can be further reduced as shown in FIG. 10. Here the filter 76 is split into two halves each clocked at $f_{sc}$. A switch 72 distributes alternate samples to each half, and thereby determines which phase of the $2 f_{sc}$ chrominance is used. An adder 74 combines the outputs of the two halves which are in anti-phase to produce a total sample rate of $2 f_{sc}$. Half the adder output samples are invalid, and switch 68 must select the valid phase. This occurs after the output of the larger part of the filter 76 (the lower part as shown).

Figure 11:
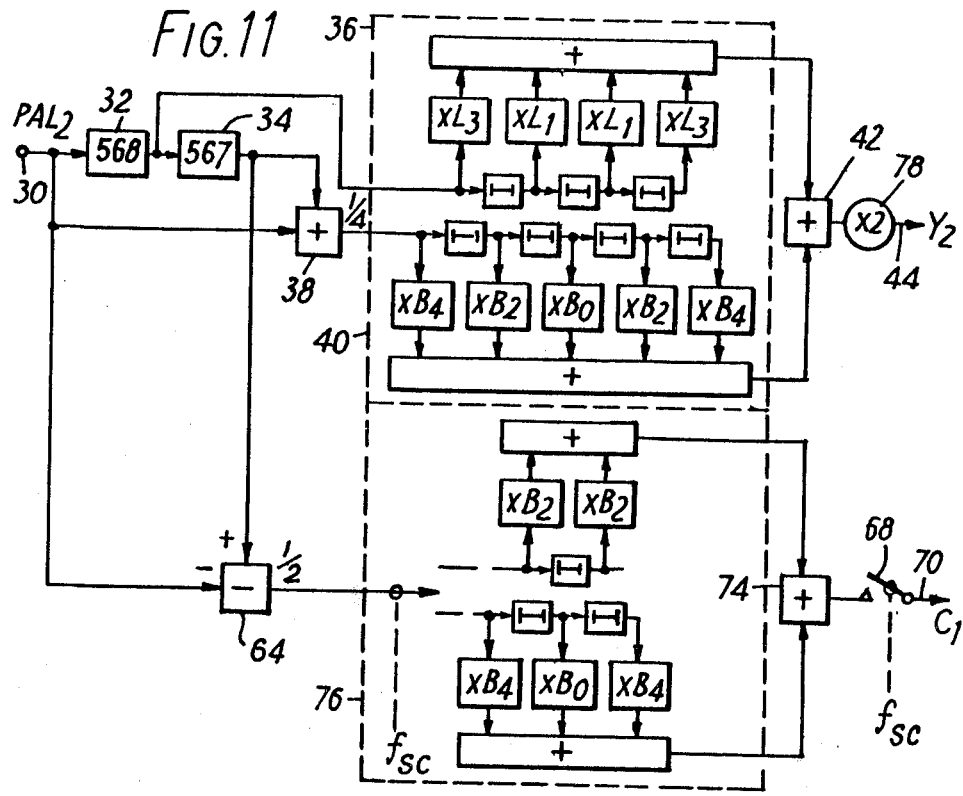
FIG. 11 is a block diagram of a modified transcoder embodying the invention based on a combination of FIGS. 7, 9 and 10, for transcoding from 2 $f_{sc}$ to 3 $f_{sc}$ format.

The luminance path of FIG. 7 and the chrominance path of FIGS. 9 and 10 can be combined as shown in FIG. 11, with the same line delays used for both. Further description of the circuit of FIG. 11 is unnecessary in view of the previous figures, but it should be noted that allowance has been made for the gain factor of $\frac{1}{2}$ inherent in the arrangement of FIG. 1; in the luminance path by a X2 multiplier 78 and in the chrominance path by making the subtractor 64 divide by two instead of four.

So far only transcoding from the 2fsc format to the 3 fsc format has been described. The converse transcoding from Y and $C(=U\pm V)$ to $PAL_2$ will now be described with reference to the remaining figures. The two component elements of such a transcoder are shown in FIGS. 12 and 13 respectively.

Figure 12:
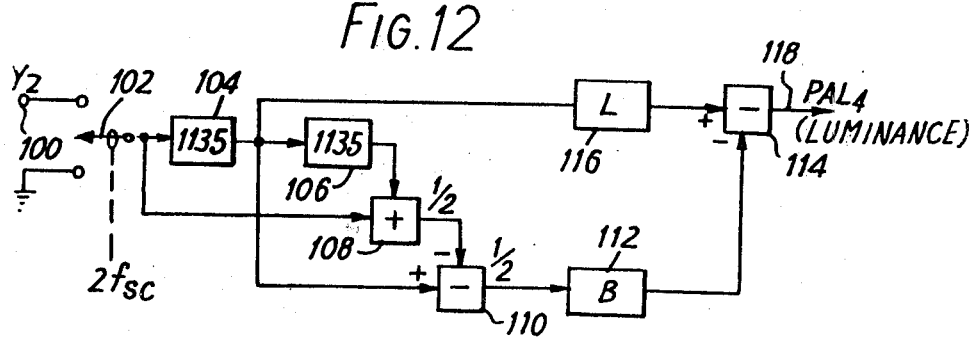
FIG. 12 is a block diagram of a circuit embodying the invention for forming luminance signals sampled at 2 $f_{sc}$ into encoded PAL$_2$ form.

FIG. 12 shows a transcoder for coding received luminance signals $Y_2$ sampled at 2fsc into an encoded PAL signal. Obviously the encoded PAL signal will contain no colour information. The circuit comprises an input 100 connected to a selector switch 102 which operates at 2fsc and interposes zero-value samples alternately with the incoming 2fsc samples to produce a resultant signal at 4fsc. This signal is applied to two one-line or 1135 sample delays 104 and 106 connected in series and clocked at 4fsc. The undelayed and two-line delayed samples are added and halved in a circuit 108, and the resultant is subtracted from the one-line delayed samples in a subtractor 110. The subtractor output is halved and 100 band-pass filtered in a digital transversal filter 112, similar to the filter 22 in FIG. 1, and the filtered signal is subtracted in a subtractor 114 from the one-line delayed signal which has been low-pass filtered in a digital transversal filter 116, similar to the filter 24 of FIG. 1. The output 118 of subtractor 114 constitutes the output of the transcoder.

Figure 13:
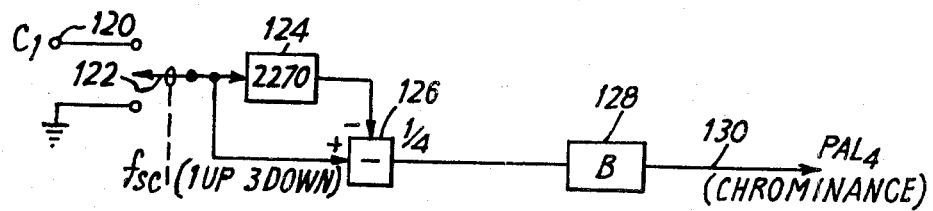
FIG. 13 is a block diagram of a circuit embodying the invention for forming composite chrominance signals sampled at $f_{sc}$ into encoded PAL$_2$ form.

In FIG. 13, an input 120 receives the composite chrominance signal C sampled at fsc. This signal is applied to a selector switch 122 which this time quadruples the sample rate by interposing three zero-value samples between each pair of the incoming samples. A two-line or 2270 sample delay 124 clocked at 4fsc receives the output of the switch 122, and a subtractor 126 subtracts the delayed signal from the undelayed signal and divides the resultant by four. The output of circuit 126 is band-pass filtered in a digital transversal filter 128, similar to the filter 52 of FIG. 1, and the filter output 130 constitutes a 4fsc encoded PAL signal but containing only chrominance information.

As shown, the gains of the luminance and chrominance paths are different. The luminance path has a gain of $\frac{1}{2}$ for similar reasoning to that given for FIG. 1. The chrominance path has a sign reversal and a gain of $\frac{1}{2}$, because three zero-value samples are inserted for every fourth input. This can of course easily be allowed for by removing the factor of $-\frac{1}{4}$.

The spatial algorithm of the chrominance path is the same as that of FIG. 8, except reversed in sign. However, the spatial pattern of 4fsc input samples is now that of FIG. 14. Again, nonzero values are shown by an X. Applying the algorithm of FIG. 8 to the samples of FIG. 14 yields zero values when both the input values above and below the output position are zero. This defines the unwanted phase of 2fsc sampling which occurs while the luminance path produces unmodified input values; the desired $PAL_2$ chrominance samples correspond to the other sampling phase.

FIG. 14 also shows that contributions are taken alternately from the top and bottom of the three lines to form the output samples. This means that the incoming non-zero chrominance samples can be stored at a rate of fsc, and by switching between the undelayed and two-line delayed signals at the store input and output respectively, samples at a rate of 2fsc can be generated for the filter 128. In this way the circuit of FIG. 13 can be replaced by the circuit of FIG. 15.

In FIG. 15, an input 140 is connected to a two-line delay 142 consisting of a 567 sample store clocked at fsc. The delayed samples are inverted in an inverter 144 and a switch 146 alternately selects the input samples the samples from the inverter 144. The switch output is applied to a band-pass filter 148, the output 150 of which constitutes the circuit output.

The luminance path of FIG. 12 and the chrominance path of FIG. 15 can be combined into a full transcoder as shown in FIG. 16. A single band-pass filter can be used in this circuit.

Referring to FIG. 16, the luminance part Y of a signal in the 3fsc format, which is itself sampled at 2fsc, is received at an input 160, while the chrominance part C sampled at fsc is received at an input 162. Two one-line delays 164 and 166 respectively comprising a 568 sample store and a 567 sample store both clocked at 2fsc are connected in series to the input 160. The undelayed signal at input 160 and the two-line delayed signal from delay 166 are averaged in a half-adder 168. A two-line delay 170 comprising a 567 sample store clocked at fsc is connected to the input 162. An inverter 172 inverts the output of delay 170, and a switch 174 corresponding to the switch 146 of FIG. 15, selects alternately the input sample and the output from the inverter 172. The resultant signal at 2fsc is applied to an adder 176 which also receives the output of adder 168.

The output of adder 176 is band-pass filtered in a digital transversal filter 178, and another digital transversal filter 180 low-pass filters the output of the delay 164. The output of filter 180 is doubled in a X2 multiplier 182 and combined with the output of filter 178 in an adder 184, the output 186 of which constitutes the transcoder output and is in the form of an encoded PAL signal sampled at 2fsc, as in accordance with British Pat. No. 1,511,230.

Thus there have been described circuits in which transcoding between the 2fsc format and 3fsc format may be achieved in a reliable manner without having to convert the signal into analogue form as an intermediate step. As described, in the luminance path, in each case over the chrominance bandwidth three successive lines of the picture are used in the proportions $\frac{1}{4}:\frac{1}{2}:\frac{1}{4}$, while below the chrominance bandwidth samples from the central line only of the three are required. In the chrominance path, the two outermost only of these three lines are used in the proportions $\frac{1}{4}:\frac{1}{4}$. More than three lines could however be used if so desired. Furthermore, while transversal filters are described for the filtering, these are not essential. They are preferred because they are convenient and simple. Also they could in principle be combined with the line delays; it will be seen that every output sample is in fact a linear combination of adjacent input samples from three (or more) input lines. Thus if the samples were to be clocked through a random access store sufficiently large to contain all the required input samples, the output samples could be formed by weighted combination of particular store locations. Other methods of implementing the methods described will be apparent to the reader.

I claim:

1. A method of processing digital PAL colour television signals, comprising the steps of:
    transcoding between (i) an encoded PAL signal sampled at twice the colour subcarrier frequency and (ii) a luminance signal sampled at twice the colour subcarrier frequency and/or a composite chrominance signal sampled at the colour subcarrier frequency and comprising the sum and difference of the quadrature colour signals on alternative lines;
    said transcoding step comprising:
    forming the output samples (a) over the chrominance bandwidth by linearly combining samples selected from three or more adjacent lines of the television signal, and (b) below the chrominance bandwidth by linearly combining samples selected from the samples on at least one of the adjacent lines; and
    filtering the output samples by means of a digital filter, to provide the desired output signal.

2. A method according to claim 1, wherein the filtering step is effected by forming linear combinations of samples.

3. A method according to claim 2, wherein the filtering step is effected by linearly combining adjacent samples from three or more adjacent lines of the television signal.

4. Apparatus for processing digital PAL colour signals comprising:
    transcoding means for transcoding between (i) an encoded PAL signal sampled at twice the colour subcarrier frequency and (ii) a luminance signal sampled at twice the colour subcarrier frequency and/or a composite chrominance signal sampled at the colour subcarrier frequency and comprising the sum and difference of the quadrature colour signal on alternate lines;
    said transcoding means comprising:
    input means;
    sample-forming means coupled to said input means for forming output samples (a) over the chrominance bandwidth by linearly combining samples selected from three or more adjacent lines of the television signal, and (b) below the chrominance bandwidth by linearly combining samples selected from the samples on at least one of the adjacent lines; and
    digital filter means coupled to said sample-forming means for filtering the output samples to provide the desired output signal.

5. Apparatus according to claim 4, wherein said transcoding means is adapted to transcode between an encoded PAL signal sampled at twice the colour subcarrier frequency and a luminance signal at twice the colour subcarrier frequency, and wherein said sample-forming means comprises:
    first digital delay means for providing a signal delayed by substantially one line period;
    second digital delay means for providing a signal delayed by substantially two line periods; and
    means coupled to said imput means for linearly combining the signals therefrom in the proportions $\frac{1}{4}:\frac{1}{2}:\frac{1}{4}$ respectively, at least over the chrominance bandwidth.

6. Apparatus according to claim 5, wherein said first and second delay means together comprise two clocked stores connected in series.

7. Apparatus according to claim 4, wherein said transcoding means is adapted to transcode between an encoded PAL signal sampled at twice the colour subcarrier frequency and a composite chrominance signal sampled at the colour subcarrier frequency, and wherein said sample-forming means comprises:
    digital delay means for providing a signal delayed by substantially two line periods; and
    means coupled to said input means and to said digital delay means for utilizing the signals therefrom in the relative proportions $1:-1$.

8. Apparatus according to claim 4, wherein said digital filter means comprises a digital transversal filter.

* * * * *